United States Patent [19]

Schulz

[11] Patent Number: 5,002,987

[45] Date of Patent: Mar. 26, 1991

[54] MODIFIED ASPHALT CEMENT

[75] Inventor: Gerald O. Schulz, Stow, Ohio

[73] Assignee: The Goodyear Tire & Rubber Company, Akron, Ohio

[21] Appl. No.: 451,682

[22] Filed: Dec. 18, 1989

[51] Int. Cl.$^5$ .............................................. C08L 95/00
[52] U.S. Cl. ........................................ 524/60; 524/71
[58] Field of Search ........................................... 524/60

[56] References Cited

U.S. PATENT DOCUMENTS

| | | | |
|---|---|---|---|
| 2,868,749 | 1/1959 | Hugg | 524/60 |
| 3,041,299 | 6/1962 | Czemski et al. | 524/60 |
| 3,769,246 | 10/1973 | Roustler et al. | 524/60 |
| 3,803,066 | 4/1974 | Petrossi | 524/60 |
| 3,979,916 | 9/1976 | Califano et al. | 524/60 |
| 4,145,322 | 3/1979 | Maldonado et al. | 260/28.5 |
| 4,456,633 | 6/1984 | Grossi et al. | 427/130 |
| 4,745,155 | 5/1988 | Grossi | 524/60 |

FOREIGN PATENT DOCUMENTS 716627  8/1965  Canada ................................. 524/60

OTHER PUBLICATIONS

Edwin J. Barth, Methods to Improve Asphalt Quality, Asphalt, Science & Technology, Gordon & Breach Science Publishers, New York-London, 1962 (pp. 623-646).

Primary Examiner—John C. Bleutge
Assistant Examiner—David W. Woodward
Attorney, Agent, or Firm—Bruce J. Hendricks

[57] ABSTRACT

The present invention relates to a modified asphalt cement containing from about 90 to about 99 parts by dry weight of an asphalt cement and from about 1 to about 10 parts by dry weight of a rubber latex having a weight average molecular weight of less than 250,000 and a Mooney viscosity ranging from about 4 to 17. The latex is a random polymer comprising from about 65 to about 85 weight percent of at least one $C_4$-$C_6$ conjugated diolefin and from about 15 to about 35 weight percent of styrene. The latex polymer is highly compatible with the asphalt cement without sacrificing many of the other desirable physical properties.

16 Claims, No Drawings

MODIFIED ASPHALT CEMENT

BACKGROUND OF THE INVENTION

Asphalt cements have been used in pavement for several years. Conventionally, rubber has been added to asphalt cements to improve the low temperature flexibility and extensibility (ductility) and increase the summer temperature viscosity. Whereas addition of a rubber latex has resulted in significant improvement in some properties, the rubber solids have a tendency to phase separate in many hot asphalts and thus become an incompatible component. Therefore, there exists a need for modified asphalt cements which contain a rubber latex that is compatible with the asphalt cement and does not tend to phase separate over time.

SUMMARY OF THE INVENTION

The present invention relates to a modified asphalt cement which is characterized by containing a rubber latex having a weight average molecular weight of less than 250,000 and a Mooney viscosity ranging from about 4 to 17. The rubber latex is a random polymer comprising from about 65 to about 85 weight percent of at least one $C_4$–$C_6$ conjugated diolefin and from about 15 to about 35 weight percent of styrene.

DETAILED DESCRIPTION OF THE INVENTION

There is disclosed a modified asphalt cement comprising (a) from about 90 to about 99 parts by weight of an asphalt cement, and (b) from about 1 to about 10 parts by dry weight of a latex having a weight average molecular weight of less than 250,000 and a Mooney viscosity ranging from about 4 to 17 wherein said latex is a random polymer comprising (1) from about 60 to 100 weight percent of at least one $C_4$–$C_6$ conjugated diolefin and (2) from about 15 to about 35 weight percent of styrene.

Asphalt is defined by ASTM as a dark brown to black cementitious material in which the predominant constituents are bitumens that occur in nature or are obtained in petroleum processing. Asphalts characteristically contain very high molecular weight hydrocarbons called asphaltenes. These are essentially soluble in carbon disulfide, and aromatic and chlorinated hydrocarbons. Bitumen is a generic term defined by ASTM as a class of black or dark-colored (solid, semi-solid or viscous) cementitious substances, natural or manufactured, composed principally of high molecular weight hydrocarbons, of which asphalts, tars, pitches, asphaltites are typical. ASTM further classifies asphalts or bituminous materials as solids, semi-solids, or liquids using a penetration test for consistency or viscosity. In this classification, solid materials are those having a penetration at 25° C. under a load of 100 grams applied for 5 seconds, of not more than 10 decimillimeters (1 millimeter). Semi-solids are those having a penetration at 25° C. under a load of 100 grams applied for 5 seconds of more than 10 decimillimeters (1 millimeter), and a penetration at 25° C. under a load of 50 grams applied for 1 second of not more than 35 millimeters. Semi-solid and liquid asphalts predominate in commercial practice today.

Asphalts are usually specified in several grades for the same industry, differing in hardness and viscosity. Specifications of paving asphalt cements generally include five grades differing in either viscosity level at 60° C. or penetration level. Susceptibility of viscosity to temperatures is usually controlled in asphalt cement by its viscosity limits at a higher temperature such as 135° C. and a penetration or viscosity limit at a lower temperature such as 25° C. For asphalt cements, the newer viscosity grade designation is the mid-point of the viscosity range. Table I below shows the ASTM grading system for AC-2.5, AC-5, AC-10, AC-20 and AC-40.

TABLE I

| Test | AC-2.5 | AC-5 | AC-10 | AC-20 | AC-40 |
|---|---|---|---|---|---|
| Viscosity, 60° C., Pa.s | 25 ± 5 | 50 ± 10 | 100 ± 20 | 220 ± 40 | 400 ± 80 |
| Viscosity, 135° C., min, mm$^2$/s) | 80 | 110 | 150 | 210 | 300 |
| Penetration of 100 g @ 25° C. for 5 s, min., mm/10 | 200 | 120 | 70 | 40 | 20 |
| Flash point, Cleveland open cup, min, °C. | 163 | 177 | 219 | 232 | 232 |
| Solubility in Trichloroethylene, min % | 99 | 99 | 99 | 99 | 99 |
| Tests on residue from thin-film oven test | | | | | |
| viscosity, 60° C., max Pa.s | 125 | 250 | 500 | 100 | 200 |
| ductility, 25° C., 5 cm/min, min, cm | 100 | 100 | 50 | 20 | 10 |

The asphalt materials which may be used in the present invention are those typically used for road paving, repair and maintenance purposes. Petroleum asphalts are the most common source of asphalt cements. Petroleum asphalts are produced from the refining of petroleum and used predominantly in paving and roofing applications. Petroleum asphalts, compared to native asphalts, are organic with only trace amounts of inorganic materials. The asphalt cements that may be used in the present invention have an ASTM grade of AC-2.5, AC-5, AC-10, AC-20 and AC-40. The preferred asphalt cements include AC-5, AC-10 and AC-20 with AC-5 and AC-10 being the most preferred grades.

The modified asphalt cement of the present invention contains a random polymer formed by the emulsion polymerization of at least one $C_4$–$C_6$ conjugated diolefin or the copolymerization of a $C_4$–$C_6$ conjugated diolefin and styrene. Examples of emulsion polymerized random styrene butadiene rubbers having Mooney values of less than 50 are known in the literature, for example, see C. A. Uraneck and E. Clark, J. Appl. Polym. Sci., 26, pp 107–127, (1981). Representative of conjugated diolefins which may be used to form the rubber latex include 1,3-butadiene, isoprene, chloroprene, 2-ethyl-1,3-butadiene, 2,3-dimethyl-1,3-butadiene and piperylene. The preferred conjugated diolefins are 1,3-butadiene and isoprene. The rubber latex that is used is a random polymer and consists of from about 65 to about 85 weight percent of bound $C_4$–$C_6$ conjugated diolefin. In the most preferred embodiment, the amount of bound conjugated diolefin ranges from about 74 weight percent to about 82 weight percent. The random polymer also comprise from about 15 weight percent to about 35 weight percent. The most preferred amount of bound styrene is from about 18 to about 26 weight percent.

The term "random" polymer is used herein to distinguish the latex polymers used in the present invention from block styrene butadiene copolymers which are not included as an essential ingredient in the modified asphalt cement.

The latex is prepared in accordance with conventional emulsion polymerization techniques. The principles of emulsion polymerization are discussed in references such as "Synthetic Rubber" by G. S. Whitby, Editor-in-Chief, John Wiley and Sons, 1954, particularly Chapter 8, and "Emulsion Polymerization" by F. A. Bovey et al, Vol. IX of "High Polymers", Interscience Publishers, Inc., 1955. Some specialized applications of these principles are indicated in U.S. Patents such as U.S. Pat. Nos. 3,080,334; 3,222,334 3,223,663; 3,468,833 and 3,099,650.

Conventional free radical polymerization initiators that are used in emulsion polymerizations include compounds such as t-butyl hydroperoxide, cumene hydroperoxide, diisopropylbenzene hydroperoxide and paramenthane hydroperoxides, and even hydrogen peroxide. These compounds perform very effectively when used in polymerization recipes containing appropriate levels of supporting ingredients. By "supporting ingredients" is meant those materials often referred to as activators in emulsion, or other systems, where required. U.S. Pat. No. 3,080,334 describes some of these materials at column 5, lines 20–26. Such materials can also be referred to as catalyst activators. The term "Redox Polymerization" is often used where the complete initiator system includes a Redox system, i.e., reducing agents and oxidizing agents in a proportion that yields polymerization initiating species. All of these initiator systems are well known in the art.

Emulsion polymerizations are normally accomplished in the range of 5° C. to 90° C. Though the activator or "Redox" initiated systems are preferred for low temperature polymerizations, they are very effective at high temperatures also, normally requiring appreciably lower quantities of the various ingredients to obtain a desirable polymerization rate.

The free radical sources used in the initiator systems are those customarily used in free radical polymerizations, for example, organic initiators such as azonitriles, azo-derivatives, peroxides and hydroperoxides and inorganic initiators such as inorganic peroxy compounds. Radiation, e.g., of the ultraviolet and gamma ray type can also be used as a free radical source. Various organic initiators are described by J. Brandrup and E. H. Immergut, Polymer Handbook (John Wiley & Sons), 1965, pages II-3 to II-51.

The rubber latex has a weight average molecular weight of less than 250,000. Preferably, the weight average molecular weight ranges from about 80,000 to about 200,000 with a range of from about 120,000 to about 150,000 being particularly preferred.

The Mooney viscosity of the random polymer that is used in the present invention preferably ranges from about 4 to 17. A Mooney viscosity of from 6 to 9 is particularly preferred. As referred herein, Mooney viscosity (ML-4) is determined by ASTM D-1646.

The viscosity of the rubber latex is generally below 2.0 Pa s for reasons of ease of handling. Generally, the viscosity of the latex ranges from about 0.5 Pa s to about 2.0 Pa s with a range of from about 1.4 Pa s to about 1.6 Pa s being preferred. The percent solids of the latex may vary widely. For example, it may be as low as 44% to an upper range of 50% for unagglomerated latexes. If agglomerated, the percent solids may range from about 60 to about 75%.

The pH of the latex which is to be added to the asphalt cement generally ranges from about 8 to about 11. Conventionally, the pH ranges from about 9.5 to 10.5.

Depending on the particular application, conventional additives such as antioxidants, bactericides, and the like may be added to the latex for subsequent mixing with the asphalt cement of the present invention.

The absolute viscosity of the modified asphalt cement (combination of asphalt cement and latex) may vary depending on such factors as the type of asphalt, the relative amounts of latex that is added to the asphalt cement, the molecular weight of the latex, and the compatibility of the latex with the asphalt cement. Generally, the absolute viscosity at 60° C. may be as low as 27±5 Pa·s when AC-2.5 is used and as high as 650± 80 Pa·s when AC-40 is used as the asphalt cement. When grade AC-5 is used, the absolute viscosity may range from about 60 Pa·s to 100 Pa·s. Whereas the absolute viscosity may range from about 100 to 340 Pa·s when grade AC-10 is used. Preferably, the absolute viscosity of the modified asphalt cement will range from about 70 Pa·s to about 220 Pa° s with a range of from about 80 Pa·s to about 100 Pa·s being particularly preferred.

The rubber latex may be added to the asphalt cement in an amount of from about 1 to about 10 parts by dry weight of the latex. Preferably, from about 1 to about 6 parts by dry weight is used with a range of from about 2 to about 3 parts being particularly preferred.

The rubber latex is slowly added to heated asphalt with agitation. The asphalt is generally heated to a temperature ranging from about 150° C. to about 170° C. After the rubber latex has been thoroughly mixed with the asphalt cement, one should store the modified asphalt cement at these temperatures to avoid solidification prior to use.

In addition to the rubber latex and the asphalt cement, the modified asphalt cement of the present invention may contain other conventional additives. Examples of conventional additives include antistripping compounds, fibers, release agents, aggregates and fillers. The mineral aggregates and fillers may comprise from about 0 to about 1000 parts by dry weight based on the dry weight of the asphalt cement. Examples of mineral aggregates and fillers which may be used include kaoline clay, calcium carbonate, bentonite clay, sanders dust, cellulose fibers, sand and stone.

The following examples are provided for the purpose of illustrating and not limiting the present invention.

EXAMPLE 1

Preparation of Random SBR Latex

A SBR latex was prepared using the recipe below. All parts are parts by weight unless stated otherwise.

| Ingredients | Parts |
| --- | --- |
| A. Soft water (boiled) | 141.00 |
| Linear alkyl sulfonic acid | 3.00 |
| Na salt of condensed naphthalene sulfonic acid | .22 |
| Potassium sulfate | .42 |
| B. Styrene | 30.00 |
| Tertiary dodecyl mercaptan | .30 |
| C. Hydroperoxide initiator | .23 |

-continued

| Ingredients | Parts |
| --- | --- |
| D. Butadiene | 70.00 |
| E. EDTA (Na salt) | 0.016 |
| Ferrous sulfate heptahydrate | 0.027 |
| Sodium formaldehyde sulfoxylate | 0.05 |
| F. Water | 8.00 |
| Shortstop | .37 |

Into a suitable reaction vessel was charged ingredients A, and then the vessel was sparged with nitrogen. Ingredients B, C and D were then charged to the vessel followed by syringing of E into the vessel. The vessel was maintained at 10° C. until 29% solids (about 68% monomer conversion) and ingredient F was added. The monomers were stripped from the shortstopped latex. The random styrene butadiene rubber had a weight average molecular weight of approximately 190,000 and a Mooney viscosity percentage of 17. The weight percent of bound styrene in the random styrene butadiene rubber was approximately 24 weight percent.

EXAMPLE 2

Two parts by dry weight of a cold polymerized random styrene butadiene anionic latex containing 24 by weight of bound percent styrene was added to 100 parts by weight AC-5 asphalt cement marketed by Diamond Shamrock. The latex was slowly added to the asphalt cement under moderate agitation while heated to 160° C. After addition of the latex was completed, the modified asphalt cement was agitated for an additional hour. Various samples of styrene butadiene latexes were tested having different weight average molecular weights and Mooney viscosities (ML-4). The compatibility and physical properties of the modified asphalt cements were measured. Table II lists the data for the samples. The test for compatibility of the asphalt cement/latex mixture was measured by placing the modified asphalt cement in an oven operated at 160° C. for a period of 18 to 24 hours without agitation. The samples of modified asphalt cement were removed from the oven and observed for phase separation. A rating of 0 to 10 was used to grade the various samples. The scale ranged from 0 for complete separation into two phases to 10 for no detection of any separation of phases.

TABLE II

| Sample | Weight Average Molecular Weight | Mooney ML-4 | Compatibility | Modified Asphalt Viscosity @ 60° C. (Pa.s) | Ductility Aged[1] |
| --- | --- | --- | --- | --- | --- |
| 1 | 368,000–487,000 | 125–140 | 0 | — | 26 |
| 2 | 614,000 | 134 | 0 | — | — |
| 3 | 342,000 | 42 | 0 | — | 10 |
| 4 | 326,000 | 41 | 7 | — | 8 |
| 5 | 200,000 | 16 | 10 | 74.4 | — |
| 6 | 192,000 | 16 | 10 | 90.4 | 8 |
| 7 | 190,000 | 17 | 10 | 66.2 | — |
| 8 | 177,150 | 13 | 10 | 70.0 | — |
| 9 | 173,000 | 11 | 10 | 64.0 | — |
| 10 | 170,000 | 12 | 10 | — | 29 |
| 11 | 160,000 | 10.3 | 10 | 71.0 | — |
| 12 | 154,200 | 9 | 10 | — | 41 |
| 13 | 151,000 | 9.6 | 10 | 67.3 | — |
| 14 | 140,800 | 8.3 | 10 | 92.7 | — |
| 15 | 136,000 | 4.8 | 10 | 72.8 | — |
| 16 | 135,800 | 5 | 10 | 70.9 | — |
| 17 | 122,800 | 6 | 10 | 81.5 | 62 |
| 18 | 121,500 | 5 | 10 | — | 58 |
| 19 | 101,500 | 5 | 10 | 64.9 | — |
| 20 | 100,000 | 3.5 | 10 | 64.1 | — |
| 21 | 97,500 | 3.3 | 10 | 69.0 | — |

[1]Measured at 4° C. in centimeters after aging for 48 hours at 163° C.

As can be seen from Table II, use of random styrene butadiene rubbers having a weight average molecular weight of less than 250,000 and a Mooney viscosity of below 17 (Examples 5–21) result in acceptable compatibility values of 10. However, use of random styrene butadiene rubbers having a weight average molecular weight greater than 250,000 and a Mooney viscosity above it (Examples 1–4) result in unacceptable compatibility values. In addition, use of the random styrene butadiene copolymers having a weight average molecular weight ranging from about 120,000 to about 150,000 and a Mooney viscosity ranging from 6 to 9 provides exceptionally high absolute asphalt viscosities.

EXAMPLE 3

Two parts by dry weight of a cold polymerized random styrene butadiene anionic latex containing approximately 24% bound styrene was added to 100 parts by weight of various AC-5 asphalt cements marketed by a number of companies. The weight average molecular weight of the random styrene butadiene rubber was 192,500 and the Mooney viscosity was approximately 16. The viscosity of each modified asphalt cement was measured in pascals sec. at 60° C. In addition the ductility, penetration, softening point and flow at 40° C. was measured. The ductility of the modified asphalts was measured at 4° C. in centimeters. The penetration values were measured in decimillimeters at 25° C. under a load of 100 grams applied for 5 seconds. Softening point (ring and ball) was measured in degrees centigrade. The flow was the distance in centimeters which the modified asphalt cement flowed down a 75° slope at a temperature of 40° C. Table III below lists the data from the various samples.

TABLE III

| Sample | Asphalt Cement | Viscosity @ 60° C. (Pa s) | Ductility | Penetration | Softening Point °C. | Flow at 40° C. |
| --- | --- | --- | --- | --- | --- | --- |
| 1 | Exxon | 715 | 150+ | 145 | 36 | 9.0 |
| 2 | Trumbell | 784 | 150+ | 101 | 42 | 8.5 |

TABLE III-continued

| Sample | Asphalt Cement | Viscosity @ 60° C. (Pa s) | Ductility | Penetration | Softening Point °C. | Flow at 40° C. |
|---|---|---|---|---|---|---|
| 3 | Texaco | 841 | 150+ | 83 | 37 | 6.0 |
| 4 | Diamond Shamrock | 904 | 150+ | 87 | 37 | 6.0 |
| 5 | Fina | 685 | 150+ | 104 | 39 | 5.6 |
| 6 | Coastal | 792 | 150+ | 101 | 36 | 6.5 |
| 7 | Kerr McGee | 648 | 150+ | 131 | 37 | 9.0 |

EXAMPLE 4

Two parts by dry weight of a cold polymerized random styrene butadiene anionic latex containing approximately 25% by weight of bound styrene was added to 100 parts by weight of AC-10 asphalt cement marketed by Diamond Shamrock. Various samples of modified asphalt cements were prepared using styrene butadiene latexes having different weight average molecular weights and Mooney viscosities (ML-4). The compatibility as well as the physical properties of each of the modified asphalt cements was measured. Table IV below lists the data for the samples.

TABLE IV

| Sample | Weight Average Molecular Weight | Mooney ML-4 | Compatibility |
|---|---|---|---|
| 1 | 368,000–487,000 | 125–140 | 5 |
| 2 | 190,000 | 17 | 10 |
| 3 | 180,000 | 12 | 10 |
| 4 | 172,000 | 11 | 10 |
| 5 | 130,000 | 7 | 10 |

What is claimed is:

1. A modified asphalt cement comprising:
   (a) from about 90 to about 99 parts by dry weight of an asphalt cement; and
   (b) from about 1 to about 10 parts by dry weight of a rubber latex having a weight average molecular weight of less than 250,000 and a Mooney viscosity ranging from 4 to 17 and wherein said formed by emulsion polymerization and comprises: (1) from about 65 to about 85 weight percent of at least one $C_4$–$C_6$ conjugated diolefin; and
   (2) from about 15 to about 35 weight percent of styrene.

2. The modified asphalt cement of claim 1 wherein said conjugated diolefin is selected from the group consisting of 1,3-butadiene, isoprene, chloroprene, 2-ethyl-1,3-butadiene, 2,3-dimethyl-1,3-butadiene and piperylene.

3. The modified asphalt cement of claim 2 wherein said $C_4$–$C_6$ conjugated diolefin is butadiene or isoprene.

4. The modified asphalt cement of claim 3 wherein said $C_4$–$C_6$ conjugated diolefin is butadiene.

5. The modified asphalt cement of claim 1 wherein said weight average molecular weight ranges from about 80,000 to about 200,000.

6. The modified asphalt cement of claim 5 wherein said weight average molecular weight ranges from about 120,000 to about 150,000.

7. The modified asphalt cement of claim 8 wherein said Mooney viscosity ranges from about 6 to about 9.

8. The modified asphalt cement of claim 1 wherein said latex is a random copolymer comprising:
   (1) from about 74 to about 82 weight percent of bound $C_4$–$C_6$ conjugated diolefin: and
   (2) from about 18 to about 26 weight percent of bound styrene.

9. The modified asphalt cement of claim 1 comprising from about (a) 94 to about 99 parts by dry weight of said asphalt cement: and (b) from about 1 to 6 parts by dry weight of said rubber latex.

10. The modified asphalt cement of claim 1, comprising from about (a) 97 to about 98 parts by dry weight of said asphalt cement: and (b) from about 2 to 3 parts by dry weight of said rubber latex.

11. The modified asphalt cement of claim 1 wherein said asphalt cement has an ASTM grade selected from the group consisting of AC-2.5, AC-5, AC-10, AC-20 and AC-40.

12. The modified asphalt cement of claim 11 wherein said asphalt cement has an ASTM grade selected from the group consisting of AC-5 and AC-10.

13. The modified asphalt cement of claim 12 wherein said asphalt cement has an ASTM grade of AC-5.

14. The modified asphalt cement of claim 13 wherein said asphalt cement has an ASTM grade of AC-10.

15. The modified asphalt cement of claim 1 wherein the absolute viscosity at 60° C. ranges from about 27±5 Pa·s to about 650±80 Pa·s.

16. The modified asphalt cement of claim 1 wherein the absolute viscosity of 60° C. ranges from about 70 Pa·s to about 220 Pa·s.

* * * * *